United States Patent [19]

Gariglio

[11] Patent Number: 5,377,442
[45] Date of Patent: Jan. 3, 1995

[54] BAIT RIGGING SYSTEM

[76] Inventor: Barry Gariglio, 2251 NW. 40th Terr., Coconut Creek, Fla. 33060

[21] Appl. No.: 56,715

[22] Filed: May 3, 1993

[51] Int. Cl.$^6$ .............................................. A01K 83/06
[52] U.S. Cl. ..................................... 43/44.4; 43/44.2; 43/44.6
[58] Field of Search ...................... 43/44.2, 44.4, 44.6

[56] References Cited

U.S. PATENT DOCUMENTS

| 2,848,836 | 8/1958 | Dodd | 43/44.6 |
|---|---|---|---|
| 3,645,031 | 2/1972 | Egles | 43/44.2 |
| 3,914,896 | 10/1975 | Sahagian | 43/44.6 |
| 4,067,135 | 1/1978 | Martin | 43/44.6 |
| 4,133,132 | 1/1979 | Ellis | 43/44.4 |
| 4,848,023 | 7/1989 | Ryder | 43/44.4 |
| 4,869,014 | 9/1989 | Francklyn | 43/44.6 |
| 4,932,154 | 6/1990 | Andreetti | 43/44.6 |
| 5,189,826 | 3/1993 | Schlaegel | 43/44.6 |
| 5,218,780 | 6/1993 | Jacobson | 43/44.4 |

Primary Examiner—Kurt C. Rowan
Attorney, Agent, or Firm—Malin, Haley, DiMaggio & Crosby

[57] ABSTRACT

A bait rigging system, comprising a housing, a leader wire and a hook, whereby the bait rigging system has two methods of operation, one being inserting the hook into the throat of the bait and sliding the housing over the beak of the bait, and the other being sliding one end of the leader wire into the rear of the bait, exiting the leader wire at the bait's throat, pulling the wire forward until the hook which is attached to the other end of the leader wire fully engages the bait and then mounting the housing onto the open end of the leader wire and over the beak of the bait, and finishing the process in both methods by depressing a trigger into the housing to keep the bait in a locked and secure position.

11 Claims, 3 Drawing Sheets

BAIT RIGGING SYSTEM

BACKGROUND OF THE INVENTION

1. Field of the Invention

This invention relates generally to a bait rigging system, and more particularly, to a ballyhoo bait rigging system that reliably secures bait, thus allowing a fishing line to go virtually unattended while trolling.

2. Description of the Prior Art

Fishermen have long been plagued with the frequent occurrence of losing bait while trolling or just fishing. The problem is more prevalent with ballyhoo or similar bait, because of the difficulty that exists in securing this kind of bait to the line. Ballyhoo is difficult to properly hook, therefore it is easily lost, even when correctly rigged. Ballyhoo-type bait therefore has a tendency to fall off the hook, slide up the line, or be intercepted by a fish without making a catch. Because trolling and fishing with ballyhoo bait is popular as a sport and livelihood, several conventional methods for rigging are available, however they remain ineffective.

One such method is the double-hook method. The double-hook convention employs a double hook with copper wire for wrapping around the nose of the ballyhoo. This attempts to secure the bait to the hooking mechanism. The double hook rigging convention, however, has several disadvantages. First, it necessitates two hooks and additional copper wire. This rigging technique also has a tendency to injure fishermen wherein the sharp end of the leader wire protrudes from the fish. Other disadvantages with the double hook convention are that it requires specific knowledge and experience, it is time consuming, and it requires bait preparation.

A second method employed is the single hook rig. This method also utilizes copper wire and proves to be unreliable, wherein most of the ballyhoo is left unsupported because the hook must be positioned so far forward in the bait that strike opportunities are lost when the bait is taken. In addition, prior knowledge of rigging is required, making the rigging procedure time consuming, especially for beginners. Once again, the leader wire is left dangerously exposed.

The chain rig presents a third option for rigging ballyhoo, but like the preceding methods, it proves to be inefficient and unreliable. Copper wire is again utilized to secure the nose of the bait, and requires specific knowledge and experience to properly wrap the bait to avoid slippage. The chain rig system also requires a special tool for rigging, that is the needle tool. Furthermore, this method lacks the strength necessary to insure large catches.

Although conventional riging techniques are available, they remain unreliable, time consuming, inconvenient, and ineffective. Therefore, there exists a need for a rigging system that is simple, convenient, reliable, and durable, to replace the antiquated conventions being employed today. The present invention offers such a device that eliminates the need for additional tools and wire, alleviates the risk of injury, and provides a stronger, more reliable system.

SUMMARY OF THE INVENTION

The present invention overcomes the foregoing disadvantages found in the prior art by providing a ballyhoo bait rigging system that uses a housing means in conjunction with a leader wire and hook to securedly attach bait to a fishing hook mechanism. The housing means is comprised of a housing section and a hinged lever or trigger. The housing section is adapted to telescopically mate with the beak of the ballyhoo bait or any similar type of bait. The housing section has a notch in its upper portion to accommodate bait of various sizes. The housing section is substantially conical, having an entrance aperture and an exit aperture for a bait fish's beak, wherein the entrance aperture diameter exceeds the size of the exit aperture diameter. An aperture is also provided in the lower portion of the housing to accommodate a hinged lever, which provides a locking mechanism. The hinged lever or trigger is integrally combined with the housing section. In the preferred embodiment, a sleeve for inserting one end of a leader wire is provided along the top edge of the trigger, thus comprising the entire housing means.

The trigger protrudes somewhat from the bottom center position of the housing and extends longitudinally toward the entrance opening when in the closed position. The trigger contains interlocking grooves which, once employed, lock in the bait. The leading edge of the trigger becomes substantially perpendicular to the housing section when engaged, while compressing and penetrating the cartilage of the beak.

In a first position, the trigger protrudes from the bottom of the housing section to allow the bait access to the interior portion of the housing section. In a second position, the trigger is engaged and moved upwardly into the interior portion of the housing section wherein the leading edge of the trigger approaches 90° relative to the housing section to compress and lock in the beak of the bait. In addition, the leader wire is juxtaposed along the top edge of the trigger so that upon engagement of the trigger, the leader wire is bent, creating a path of forward resistance, which provides additional support and compression. Thus, the housing means encapsulates the beak of the bait fish, locks the device onto the cartilage, and bends the leader wire such that the bait remains secure and does not slip.

The instant invention has two preferred methods for its utilization. The first method is referred to as the "short hook procedure." The device is prefabricated, wherein the leader wire is "threaded" as follows. The wire is inserted through either the entrance or exit aperture, into the sleeve in the trigger, and pulled out the other of the entrance or exit apertures, such that after threading, the end protruding from the exit aperture contains a fishing line connection and the end protruding from the entrance aperture contains a hook. To utilize the instant invention with this method, the ballyhoo is first arched as much as possible without damaging same. The barb of the hook is inserted into the ballyhoo's throat between the gills, such that it is substantially centered to prevent twisting during fishing. The barb of the hook then exits at the bottom center of the ballyhoo's belly, also to prevent twisting. The eye or distal end of the hook is then pulled into the gill area while the ballyhoo is straightened longitudinally along the hook and leader wire. The bait is then secured to the bait rigging system by sliding the housing means over the leader wire and onto the beak cartilage of the ballyhoo. It is important to insure that the trigger of the housing means is between the gills of the ballyhoo's throat. The bait is then secured by depressing the trigger such that it interlocks, which bends the leader wire and secures the beak. Once the cartilage is adequately compressed, the excess beak is removed.

The second preferred method of utilizing the instant invention requires that the hook first be attached to the leader wire. The back of the ballyhoo is then arched so that the ballyhoo is belly-up, and the free end of the wire fed through the anal orifice or cavity of the ballyhoo toward the "target area," exiting at or near the ballyhoo's throat. The hook is then pulled loosely by the leader wire into the cavity until it engages the ballyhoo. To join the leader wire with the housing means, the leader wire projecting from the throat is then threaded through the entrance aperture as described above. The housing means is then guided along the leader wire and over the beak of the bait. Next, the bait should be gently straightened so that it is not stiffly positioned on the rigging system. Once making sure the trigger is between the gills of the ballyhoo's throat, it is pressed firmly until completely shut and locked, thus compressing and securing the cartilage. The excess beak is then snapped and removed.

In an alternate embodiment, the housing may be configured with the sleeve for inserting one end of the leader wire below the exit aperture, and extending longitudinally within the housing, with the top edge of the trigger having a guiding channel. In this embodiment, the leader wire is then threaded as follows. The leader wire is inserted into the sleeve, guided into the channel in the top edge of the trigger, and pulled out the entrance aperture.

In accordance with the present invention, it is an object thereof to provide a ballyhoo bait rigging system that will reliably secure the bait to a fishing mechanism.

An additional object of the instant invention is to provide a bait rigging system that is disposable.

Still an additional object of the instant invention is to provide a bait rigging system that is simple in design, low in cost, and reliable.

Another object of the instant invention is to provide a bait rigging system that has not been realized by previous conventional methods once employed.

In accordance with these and other objects which will be apparent hereinafter, the instant invention will now become described with particular reference to the accompanying drawings.

DESCRIPTION OF THE PREFERRED EMBODIMENTS

Figure 1:
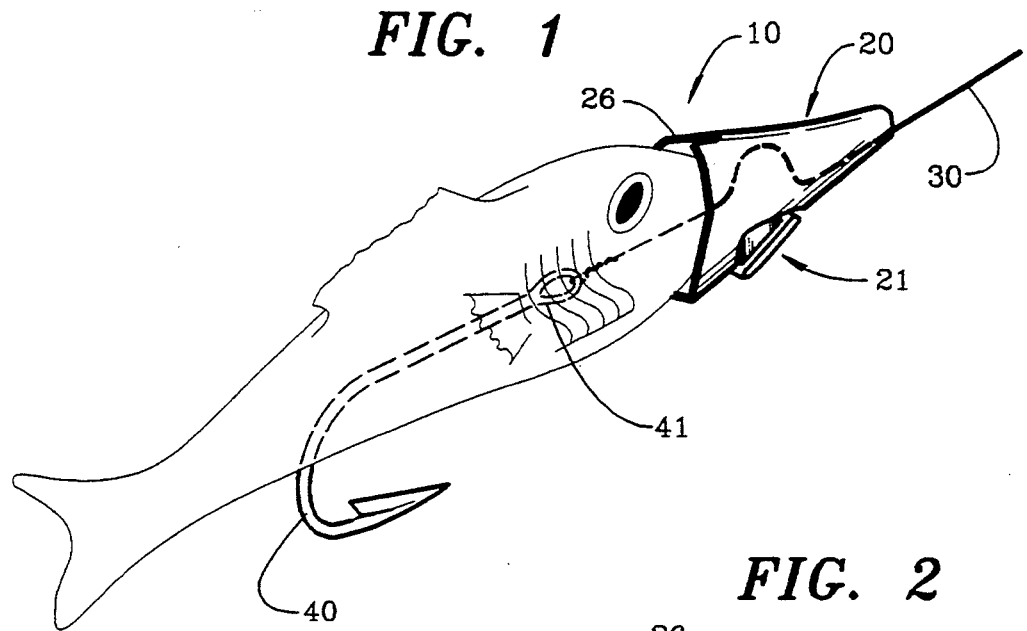
FIG. 1 is a perspective view of the preferred embodiment of the instant invention containing the ballyhoo bait insert.

Referring now to the drawings, FIGS. 1-5, and in particular to FIG. 1, the present invention, or bait rigging system, is shown generally at 10, comprising a housing section 20, a leader wire 30 and a hook 40, which are used in conjunction with each other.

Figure 2:
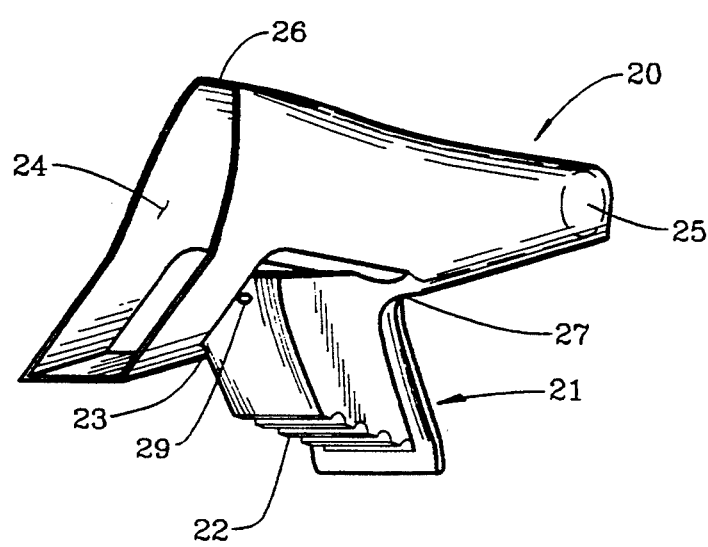
FIG. 2 is a perspective view of the housing section.
Figure 3:
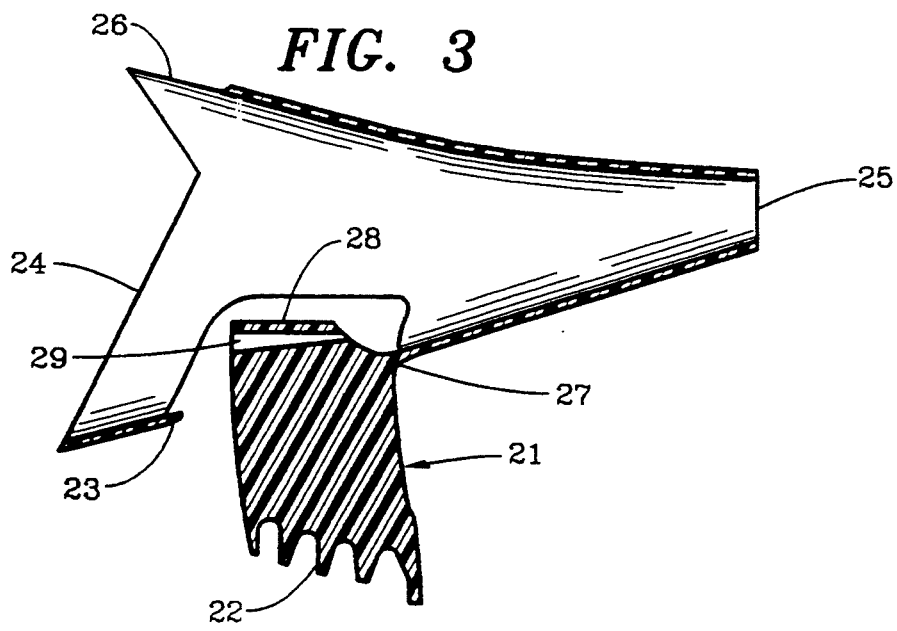
FIG. 3 is a cross sectional side elevational view of the housing section.
Figure 3A:
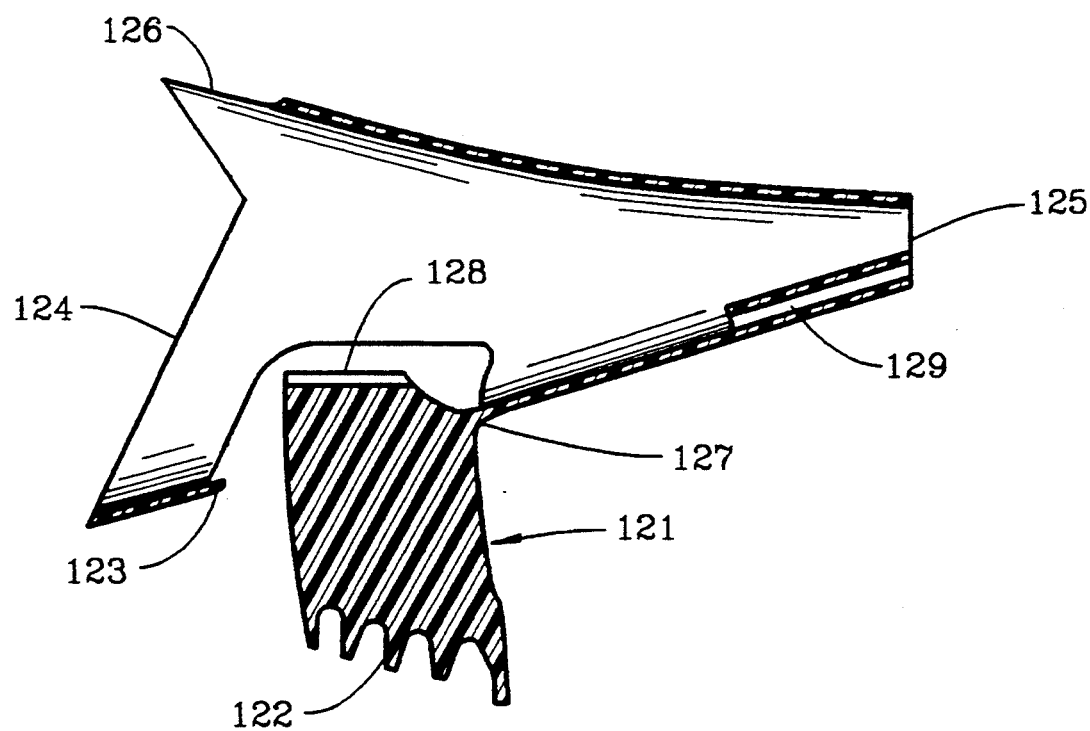
FIG. 3A is a perspective view of an alternate embodiment of the housing section.
Figure 4:
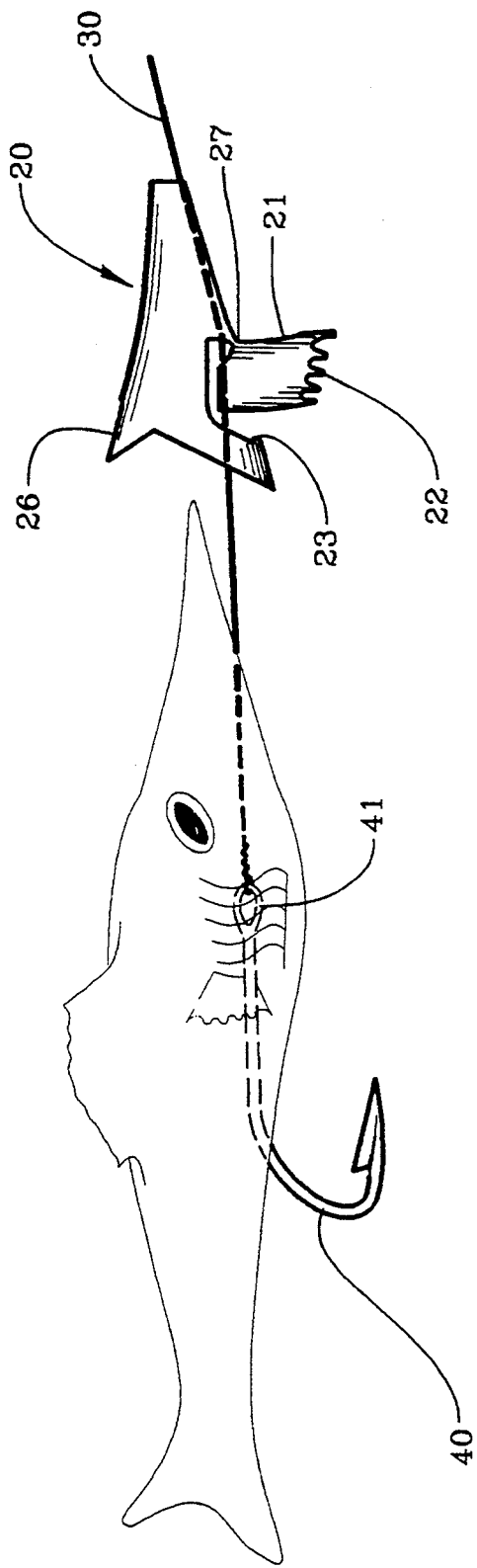
FIG. 4 is a perspective view of the preferred embodiment of the instant invention prior to inserting the bait into the housing.
Figure 5:
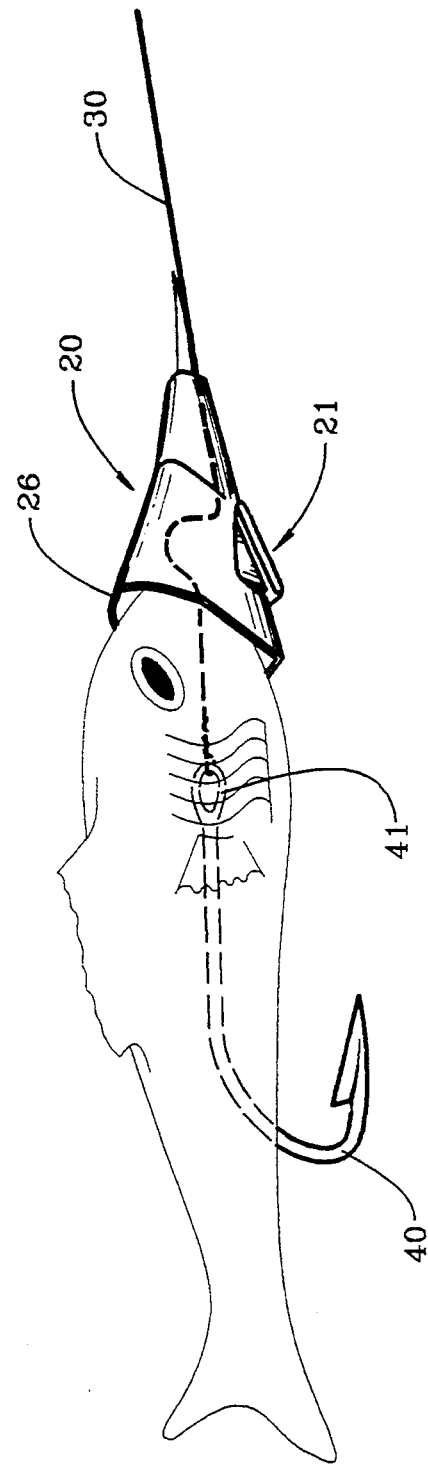
FIG. 5 is a perspective side elevational view of the instant invention.

The housing section 20 as shown in FIG. 2 is substantially conical, wherein an entrance opening 24 exceeds the size of an exit opening 25, such that the housing 20 telescopically mates with the beak of a ballyhoo or similar bait fish, as displayed in FIG. 1. Notch 26 is provided at the top edge of housing 20 to accommodate varying sizes of bait. Opening 24 provides the entrance for the bait's beak, while opening 25 provides the exit. The housing section 20 also comprises a trigger 21 which is integrally combined with the housing section 20. Trigger 21 extends downwardly from the bottom edge of the housing when not engaged. The trigger 21 contains interlocking grooves 22 which mate or lock with latch 23 when trigger 21 is engaged, causing the top or leading edge 28 of trigger 21 to be oriented substantially 90° relative to housing 20. Housing section 20 also includes a sleeve 29, which provides an aperture for inserting leader wire 30 into. In the preferred embodiment, sleeve 29 is in the top edge of trigger 21, as shown in FIGS. 2 and 3. In an alternate embodiment, sleeve 129 may be located within the exit aperture 125 and extend longitudinally within the housing 120, as shown in FIG. 3A.

The housing section 120 is substantially conical, with the entrance aperture 124 exceeding the size of the exit aperture 125, such that housing 120 telescopically mates with the beak of a ballyhoo or similar bait fish. A notch 126 is provided at the top edge of housing 120 to accommodate varying sizes of bait. Aperture 124 provides the entrance for the bait's beak, while aperture 125 provides the exit. The housing section 120 also comprises a trigger 121 which is integrally combined with the housing section 120. Trigger 121 extends downwardly from the bottom edge of the housing when not engaged. The trigger 121 contains interlocking grooves 122 which mate or lock with latch 123 when trigger 121 is engaged, causing the top or leading edge 128 of trigger 121 to be oriented substantially 90° relative to housing 120. Housing section 120 also includes a sleeve 129, which provides an aperture for inserting leader wire 130 into, and a channel or groove along the top edge 128 of trigger 121 for guiding the leader wire 130.

The instant invention has two preferred methods for its utilization. To utilize the instant invention in the first method, or "short hook procedure," the device 10 must be "prefabricated," wherein the leader wire 30 contains a hook at one end. The free end of the wire is inserted through sleeve 29 in the housing 20 and pulled out the other end. The end of leader wire 30 protruding from entrance aperture 24 maintains a hook 40 while the opposite end of leader wire 30 protruding from exit aperture 25 provides a connection to a fishing line. To utilize the instant invention with this method, the ballyhoo is first arched and the barb of the hook 40 is inserted into the throat between the gills such that it is substantially centered to prevent twisting during fishing. The barb then exits at the bottom center of the ballyhoo's belly, wherein by centrally locating the hook, the bait is prevented from twisting during trolling. The eye 41 of hook 40 is then pulled into the gill area while the ballyhoo is straightened longitudinally along hook 40 and leader wire 30. The ballyhoo is then secured to the bait rigging system 10 by sliding the housing means 20 over the leader wire 30 and onto the beak cartilage of the ballyhoo. To secure the bait, the trigger 21 is then depressed upwardly into the housing means 20 until interlocking grooves 22 become connected with latch 23. At this point, the top or leading edge 28 of trigger 21 will be oriented substantially 90° relative to housing 20 and will provide the compression against the beak cartilage. In addition, leader wire 30, which is juxtaposed along the top edge of the trigger, is bent, creating a path of forward resistance, which provides additional support and compression. Once the cartilage is completely compressed, the excess beak extending through exit aperture 25 and beyond housing 20 is broken off and removed.

The second preferred method of utilizing the instant invention requires that the eye 41 of hook 40 be attached to leader wire 30. The free end of leader wire 30 is then inserted into the anal opening of the ballyhoo and pushed toward the "target area," exiting at or near the ballyhoo's throat. The hook 40 is then pulled loosely by the leader wire 30 into the cavity until it fully engages the ballyhoo. The housing means 20 is then transversely moved along leader wire 30 and over the beak of the bait. As in the first method, the trigger 21 is depressed and pivoted about hinge 27 until interlocking grooves 22 join latch 23, locking therein. As a result, leading edge 28 will make contact, penetrating and compressing the beak of the ballyhoo, providing sufficient compression to maintain the bait. Upon sliding the housing means 20 along the leader wire 30, the bait's beak will enter opening 24 and the beak will exit opening 25. Also, when trigger 21 is depressed into housing means 20, leader wire 30 will be bent thereabout, creating a path of forward resistance and providing additional support and compression. This will insure an additional securing means. The excess beak is then snapped and removed.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A ballyhoo bait rigging system comprising:
   means for housing, said means for housing having an entrance aperture and an exit aperture for encapsulating a bait fish's beak, said means for housing being adaptable to accommodate different sized bait, said means for housing having means for receiving leader wire, said means for housing further having means for exerting a compressive force on said bait fish's beak, said means for exerting a compressive force comprising a trigger hingedly attached to a bottom edge of said housing such that said bait fish is secured within said housing, said trigger having grooves disposed along its bottom edge such that when said trigger is engaged, it is moved upwardly into the interior of said housing, exerting compressive force on said bait fish's beak, wherein a groove of said trigger is interlocked with a latch on said housing to hold said trigger in place.

2. The bait rigging system of claim 1, wherein said means for receiving is a sleeve.

3. The bait rigging system of claim 2, wherein said sleeve is longitudinally disposed along the top edge of said trigger.

4. The bait rigging system of claim 2, wherein said sleeve is within said exit aperture, said sleeve extending longitudinally within said housing a predetermined distance.

5. The bait rigging system of claim 1, wherein said means for exerting a compressive force further includes a leader wire, said leader wire juxtaposed along the top edge of said trigger.

6. The bait rigging system of claim 5, wherein said leader wire further creates a path of forward resistance.

7. The bait rigging system of claim 1, wherein said entrance aperture's diameter exceeds said exit aperture's diameter.

8. The bait rigging system of claim 1, wherein said means for housing is substantially conical in shape.

9. The bait rigging system of claim 1, wherein said means for housing is fabricated from plastic.

10. A method of rigging bait fish comprising the steps of:
    (a) providing a means for housing, said means for housing having an entrance aperture and an exit aperture, said means for housing further having means for compressing hingedly attached thereto;
    (b) inserting a first end of a leader wire into a sleeve disposed within said housing, wherein said leader wire is juxtaposed with said means for compressing;
    (c) exiting said first end of said leader wire through said exit aperture;
    (d) attaching a fishing hook having a barb end and a distal end to a second end of said leader wire, said hook being attached to said leader wire at said distal end;
    (e) attaching a means for connecting fishing line to said first end of said leader wire;
    (f) inserting the barb of the hook into the bait fish's throat between the gills;
    (g) exiting the barb of the hook at the center of the bait fish's belly;
    (h) pulling the distal end of the hook into the gill area of the bait fish;
    (i) straightening said bait fish along said hook and said leader wire;
    (j) sliding said housing means over said leader wire such that the beak of said bait fish extends through said entrance aperture and said exit aperture, whereby said means for compressing is between the gills of the bait fish's throat;
    (k) engaging said means for compressing to compress the beak of said bait fish, whereby said leader wire is bent, creating a path of forward resistance, thereby providing additional support and compression; and
    (l) locking said means for compressing into place such that said bait fish is securely held within said housing.

11. A method for rigging bait fish comprising the steps of:
    (a) providing a means for housing having an entrance aperture and an exit aperture, said means for housing further having means for compressing hingedly attached thereto;
    (b) attaching a fishing hook having a barb end and a distal end to a first end of a leader wire, said hook being attached to said leader wire at said distal end;
    (c) inserting a second end of said leader wire into the anal opening of said bait fish;
    (d) exiting the second end of said leader wire at the bait fish's throat;
    (e) pulling said hook by said leader wire into the anal cavity of said bait fish until said barb end fully engages said bait fish;
    (f) inserting said second end of said leader wire into a sleeve disposed within said means for housing such that said leader wire is juxtaposed with said means for compressing;

(g) exiting said second end of said leader wire through said exit aperture;

(h) attaching a means for connecting fishing line to said second end of said leader wire;

(i) sliding said housing means over said leader wire such that the beak of said bait fish extends through said entrance aperture and said exit aperture, whereby said means for compressing is between the gills of the bait fish's throat;

(j) straightening said bait fish along said hook and said leader wire;

(k) engaging said means for compressing to compress the beak of said bait fish, whereby said leader wire is bent, creating a path of forward resistance, thereby providing additional support and compression; and (l) locking said means for compressing into place such that said bait fish is securely held within said housing.

* * * * *